May 26, 1942.   W. STAUFFACHER   2,284,455
PASTRY CUTTER
Filed Oct. 7, 1941   2 Sheets-Sheet 1

Inventor
Warner Stauffacher,
By McMorrow & Berman
Attorneys

May 26, 1942. W. STAUFFACHER 2,284,455
PASTRY CUTTER
Filed Oct. 7, 1941 2 Sheets-Sheet 2

Inventor
Warner Stauffacher;
Attorneys

Patented May 26, 1942

2,284,455

UNITED STATES PATENT OFFICE 2,284,455

PASTRY CUTTER

Warner Stauffacher, Minneapolis, Minn.

Application October 7, 1941, Serial No. 414,033

3 Claims. (Cl. 107—47)

This invention relates to a pastry cutter, and has for the primary object the provision of a device of this character which will efficiently cut dough into selected shapes for the making of cookies, doughnuts and the like and at the same time when cutting the dough also applies thereto sugar, flour or other ingredients that may be desired.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a top plan view illustrating a pastry cutter constructed in accordance with my invention.

Figure 5 is a cross sectional view of the roller of the device shown in Figure 1.

Figure 1:
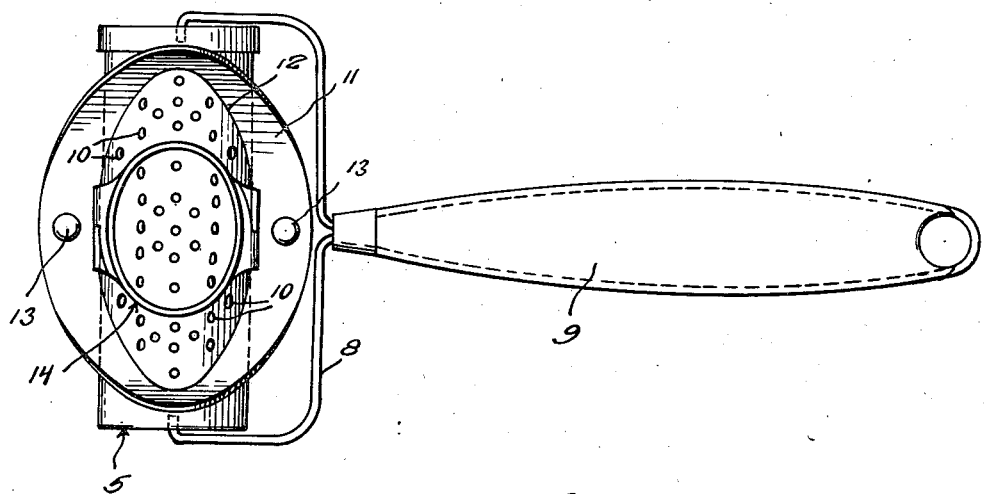
Figure 2:
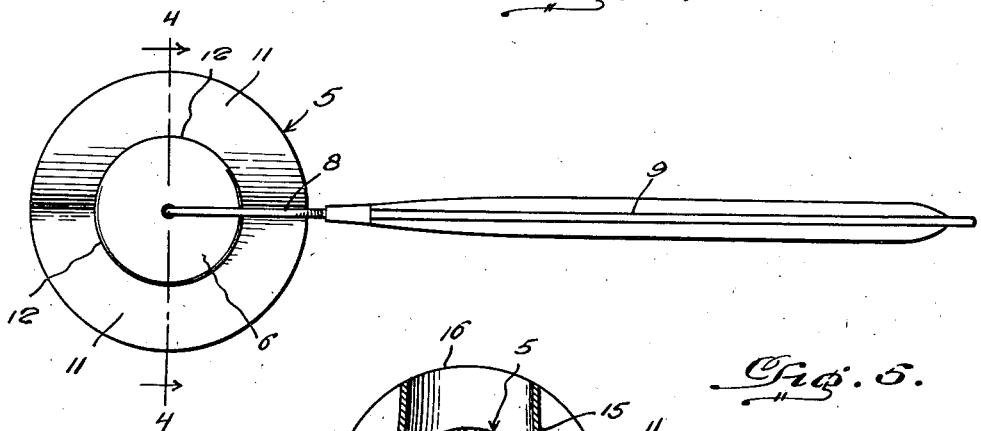
Figure 2 is a side elevation illustrating the device.

Referring in detail to the drawings, the numeral 5 indicates a hollow roller of cylindrical form provided with an integral end wall 6 and a removable end wall 7 in the form of a closure cap held in place on the roller by friction or some other suitable securing means. The end walls 6 and 7 are apertured to form bearing openings arranged axially of the roller to receive the ends of a bail 8 forming a part of a handle 9. The handle is employed for moving the roller over dough.

Figure 3:
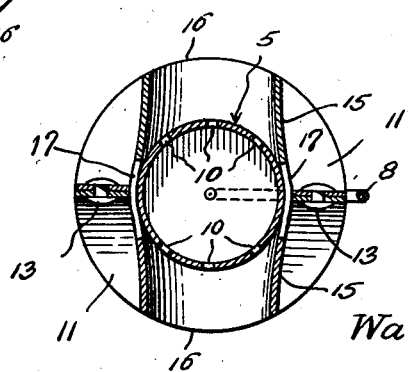
Figure 3 is a view similar to Figure 1 showing the roller thereof positioned so as to present another view of the cutter from that shown in Figure 1.
Figure 3:
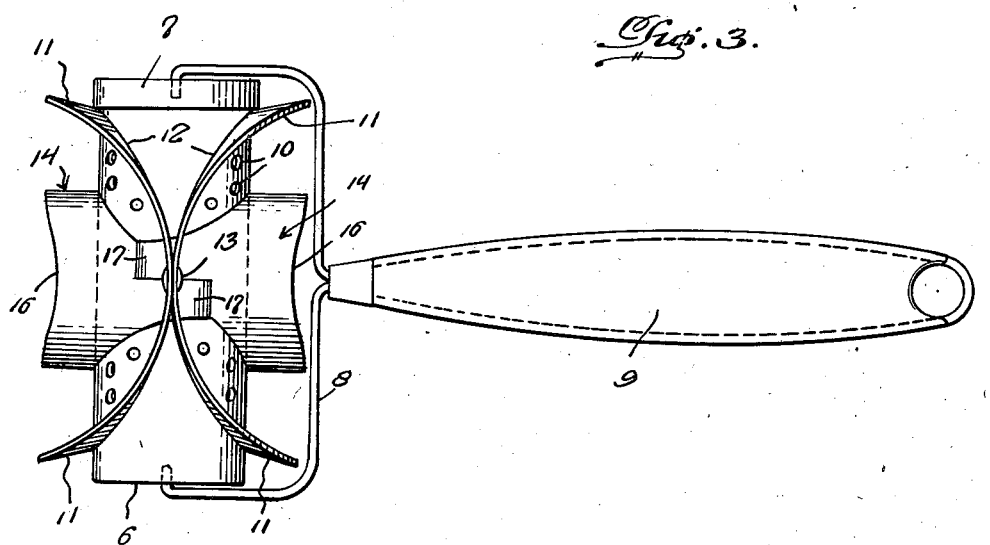
Figure 4:
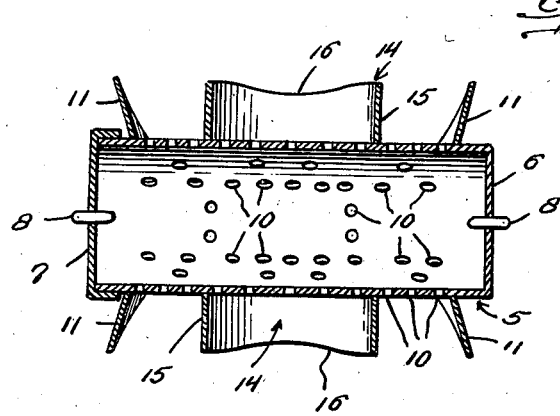
Figure 4 is a sectional view taken on the line 4—4 of Figure 2.
Figure 6:
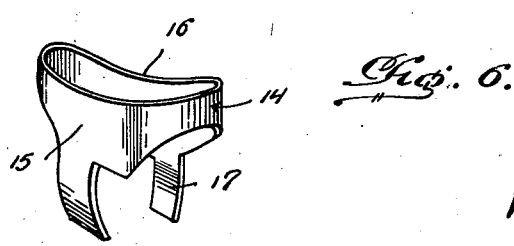
Figure 6 is a perspective view illustrating one of the cutters employed for forming a center hole or opening in the dough.

By referring to Figures 3 and 4 it will be seen that the roller is provided with a series of perforations 10 through which sugar, flour or other ingredients may sift onto the dough while being acted on by this device, the roller forming a reservoir for the ingredients which may be easily placed therein by disconnecting the bail 8 and removing the end wall 7.

Removably mounted on the roller are cutter blades 11 each constructed of spring steel or similar material and having generally a substantially oval shape and provided with a correspondingly shaped opening 12. The normal tendency of the cutter blades 11 is to assume rather a flat shape. However, when said cutter blades are secured together, as shown at 13, in opposed relation and forced upon the roller from one end thereof said blades each assume a substantially arcuate shape on opposite sides of the roller. The tendency of the blades to flatten out when applied to the roller as specified maintains said blades in gripping contact with the roller and will rotate therewith when the roller is moved over a piece of dough, the roller acting to flatten the dough and the blades acting to cut the dough into circular shaped pieces. The device arranged as described and used for cutting dough will shape the various pieces for the forming of cookies and the like and with the desired ingredients in the roller, the dough at the time of its cutting will be sprinkled with the ingredients.

In employing this device to cut dough into the shape of doughnuts, cutter blades 14 are used in conjunction with the cutter blades 11 on the roller. By referring to Figure 3 it will be seen that the cutter blades 14 are arranged in opposed relation to each other on the drum and within areas defined by the cutter blades 11.

Each cutter blade 14 consists of a body portion 15 of substantially cylindrical shape, one end of which defines cutting edges 16 for the purpose of removing the center portion of the dough cut by the blades 11. The body portion 15 is further shaped to form opposed curved spring gripping arms 17 adapted to straddle and grip the roller by extending between the latter and the cutting blades 11.

It is to be understood that the cutting blades may take on other shapes than that heretofore described and shown in the drawings for the purpose of forming the cut portions of the dough in other selected shapes.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a pastry cutter, a roller having perforations for sifting ingredients stored in said roller on the dough acted on by the roller, a handle connected to said roller, companion cutter blades of substantially oval shape arranged in opposed relation and secured to each other and of flexible material normally tending to assume flattened opposed relation to each other and having openings to permit passing of the roller through said blades to permit the latter to grip said roller for cutting dough into pieces of selected shape by the rolling of the roller over the dough.

2. In a pastry cutter, a roller having perforations for sifting ingredients stored in said roller on the dough acted on by the roller, a handle connected to said roller, companion cutter blades of substantially oval shape arranged in opposed relation and secured to each other and of flexible material normally tending to assume flattened opposed relation to each other and having openings to permit passing of the roller through said blades to permit the latter to grip said roller for cutting dough into pieces of selected shape by the rolling of the roller over the dough, and cutters arranged in opposed relation on the roller within the areas of the first named cutters to coact therewith in removing centers from the pieces of the dough cut by the first named cutters.

3. In a pastry cutter, a roller having perforations for sifting ingredients stored in said roller on the dough acted on by the roller, a handle connected to said roller, companion cutter blades of substantially oval shape arranged in opposed relation and secured to each other and of flexible material normally tending to assume flattened opposed relation to each other and having openings to permit passing of the roller through said blades to permit the latter to grip said roller for cutting dough into pieces of selected shape by the rolling of the roller over the dough, and cutters arranged in opposed relation on the roller within the areas of the first named cutters to coact therewith in removing centers from the pieces of the dough cut by the first named cutters, each of said second named cutters including a substantially cylindrical shaped body the edges of one end thereof defining cutting edges and resilient curved arms on the body to straddle and grip the roller between the latter and the first named cutters.

WARNER STAUFFACHER.